United States Patent [19]

Katsumata

[11] Patent Number: 5,190,828
[45] Date of Patent: Mar. 2, 1993

[54] LOW-GLOSS POLYACETAL RESIN COMPOSITIONS AND MOLDED ARTICLES

[75] Inventor: Tohru Katsumata, Shizuoka, Japan

[73] Assignee: Polyplastics Co., Ltd., Osaka, Japan

[21] Appl. No.: 725,797

[22] Filed: Jul. 9, 1991

[30] Foreign Application Priority Data

Jul. 9, 1990 [JP] Japan .................... 2-18117

[51] Int. Cl.$^5$ .............. B32B 9/06; C08F 283/06
[52] U.S. Cl. ...................... 428/447; 525/401; 525/398; 525/474; 428/524
[58] Field of Search ............. 525/401, 398, 474; 428/447, 524

[56] References Cited

U.S. PATENT DOCUMENTS

| | | | |
|---|---|---|---|
| 3,471,588 | 10/1969 | Kanner et al. | 260/827 |
| 3,627,839 | 12/1971 | Vandenberg | 260/874 |
| 4,812,519 | 3/1989 | Gillette | 525/106 |
| 5,047,471 | 9/1991 | Burg et al. | 525/66 |

FOREIGN PATENT DOCUMENTS

1590549 6/1981 United Kingdom.

*Primary Examiner*—John C. Bleutge
*Assistant Examiner*—Margaret W. Glass
*Attorney, Agent, or Firm*—Nixon & Vanderhye

[57] ABSTRACT

A low surface gloss polyacetal resin composition includes (A) 100 parts by weight of a polyacetal base resin and (B) between about 0.1 to 40 parts by weight of a silicon graft copolymer which is the radical copolymerization product of (a) an acrylic-modified silicone with (b) a radical-polymerizable monomer. Optionally, the compositions may have a weathering (UV-light) stabilizer. Molded articles formed of the compositions exhibit low surface gloss and weather-resistance properties and are thus usefully employed in end-use applications where such attributes are required (e.g. automotive trim parts, electronic components, and the like).

5 Claims, No Drawings

LOW-GLOSS POLYACETAL RESIN COMPOSITIONS AND MOLDED ARTICLES

FIELD OF INVENTION

The present invention generally relates to polyacetal resin compositions. More specifically, the present invention relates to polyacetal resin compositions which exhibit outstanding weather (UV-light) resistance properties as well as a low surface gloss. The compositions of this invention are especially embodied in a melt-blend of a polyacetal base resin, a specific silicone graft copolymer and, optionally, a weather (UV-light) stabilizer.

BACKGROUND AND SUMMARY OF THE INVENTION

Polyacetal resin is used in diverse fields as an engineering plastic due to its excellent physical properties, such as mechanical, electrical and chemical properties (e.g., chemical and heat resistances). However, the identification of new end-use applications for polyacetal resins often requires further property alterations and/or enhancements.

One such property that is needed when polyacetal resin is employed to form molded parts used for automotive trim or optical instruments is a relatively low surface gloss. A low surface gloss will thus reduce the light reflectivity property of the molded part. As a result, low surface gloss on molded parts will tend to cause less eye irritation (i.e., since less light will be reflected from the part's surface). Furthermore, low surface gloss on molded parts fabricated from engineering plastics tends to impart a more aesthetically pleasing high-grade appearance to the part.

An ability to "engineer" the surface gloss characteristics would also be beneficial in those instances where molded parts fabricated from polyacetal resin (which inherently exhibits a relatively high surface gloss) are used in cooperation with molded parts formed of other non-polyacetal resins. That is, it would be especially desirable to reduce the surface gloss of polyacetal resin to an extent where it is substantially equivalent to the molded parts of non-polyacetal resin in which it is cooperatively used. An inability to date to reduce the surface gloss of polyacetal resins by controlled amounts so that it is visually imperceptible with parts molded from non-polyacetal resins has thus been one barrier to using polyacetal resin in end-use applications (e.g., as parts for electric and electronic devices) where the polyacetal part will be visible.

Attempts in the past to reduce the inherently high surface gloss of polyacetal resins have included incorporating inorganic filler material, such as calcium carbonate or talc, in a polyacetal base resin. However, large amounts of such inorganic filler material must typically be added to the polyacetal base resin before the desired low surface gloss appearance is realized. The addition of relatively large amounts of inorganic filler material, however, is disadvantageous since it has a tendency to reduce the mechanical characteristics (especially elongation and toughness) normally associated with polyacetal resins. Thus, for example, the mechanical properties may be degraded by the addition of relatively large amounts of filler material to the point where molded parts of such a highly filler-loaded polyacetal resin breaks during assembly or when dropped.

Polyacetal resins which include relatively high amounts of an inorganic filler material also tend to exhibit poor weather-resistance properties. That is, polyacetal resins which are relatively highly loaded with an inorganic filler material tend to exhibit surface deterioration (e.g., crack formation and/or discoloration) when exposed to the natural outdoor elements of sunlight (ultraviolet rays), rain and the like for prolonged periods of time.

What has been needed, therefore, is a weather-resistant polyacetal resin composition which also exhibits low surface gloss characteristics. It is towards attaining such a polyacetal resin composition that the present invention is directed.

Broadly, the present invention is directed to weather-resistant polyacetal resin compositions which have low surface gloss characteristics without affecting the desirable physical properties inherent with polyacetal resins generally. More specifically, the compositions of this invention are comprised of (A) 100 parts by weight of a polyacetal base resin, and (B) between about 0.1 to about 40 parts by weight of a silicone graft copolymer prepared by the radical copolymerization of (a) an acrylic-modified silicone with (b) a radical-polymerizable monomer. The compositions may optionally contain (C) between 0.01 to 5 parts by weight of a weather (UV-light) stabilizer.

Further aspects and advantages of this invention will become more clear from the following detailed description of the preferred exemplary embodiments thereof.

DETAILED DESCRIPTION OF THE PREFERRED EMBODIMENTS

The polyacetal base resin that may be used in the compositions of the present invention is a normally solid, high-molecular weight polymer mainly comprised of repeating oxymethylene ($-CH_2O-$) units. The polyacetal base resin may be either a polyoxymethylene homopolymer or a copolymer, terpolymer or block copolymer containing a small amount of other monomeric units in addition to oxymethylene units. The polyacetal resin may be linear, branched or crosslinked. Furthermore, the degree of polymerization of the polyacetal resin is not particularly limited.

The silicone graft copolymer component that may be used in the compositions of the present invention is preferably a high-molecular weight polymer prepared by the radical copolymerization of (a) an acrylic-modified silicone with (b) a radical-polymerizable monomer. The acrylic-modified silicone component used to form the silicone graft copolymer is most preferably the condensation reaction product of a silicone represented by the following general formula (1) with an acrylic compound represented by the following general formula (2):

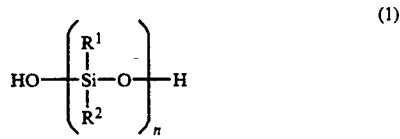

(1)

wherein $R^1$ and $R^2$ are each an aliphatic hydrocarbyl group having 1 to 10 carbon atoms, a phenyl group or a halogenated hydrocarbyl group; and n is an integer of 2 or more,

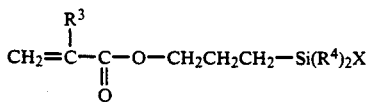

and/or

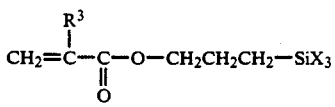

wherein $R^3$ is a hydrogen atom or a methyl group; $R^4$ is a methyl, ethyl or phenyl group; and X is an alkoxy group having 1 to 10 carbon atoms, an acetoxy group or a chlorine atom.

The substituents $R^1$ and $R^2$ bonded to the silicon atom of the silicone represented by the general formula (1) above are each preferably an aliphatic hydrocarbyl group having 1 to 10 carbon atoms, a phenyl group or a halogenated hydrocarbyl group, and most preferably a methyl group.

The acrylic compound represented by the above general formula (2) above includes γ-methacryloxy-propyldimethylchlorosilane, γ-methacryloxypropyldiethoxysilane, γ-methacryloxypropyldiethylchlorosilane, γ-acryloxypropyldimethylchlorosilane, γ-methacryloxypropyltrichlorosilane and γ-methacryloxypropyltriethoxysilane.

Preferred examples of the acrylic-modified silicone component (a) include condensation reaction products of α,ω-dihydroxypolydimethylsiloxane with γ-methacryloxypropyldimethylchlorosilane and with γ-methacryloxypropyltrichlorosilane.

The radical-polymerizable monomer component (b) used to form the silicone graft copolymer includes methacrylic acid, methyl methacrylate, ethyl methacrylate, butyl methacrylate, 2-ethylhexyl methacrylate, cyclohexyl methacrylate, acrylic acid, methyl acrylate, ethyl acrylate, butyl acrylate, styrene, vinyl esters of organic acids such as vinyl acetate and low-molecular weight, straight-chain hydrocarbons such as ethylene and propylene. Preferably, acrylic or methacrylic acid or an ester thereof, is employed as the radical-polymerizable monomer. Most preferred are radical-polymerizable monomers selected from acrylic acid, methyl acrylate, methacrylic acid and methyl methacrylate.

Among those silicone graft copolymers prepared from the components as described above, it is particularly preferable to use one prepared by the radical copolymerization of (a) a condensation product of α,ω-dihydroxypoldimethylsiloxane with γ-methacryloxypropyldimethylchlorosilane with (b) methyl acrylate or methyl methacrylate.

The silicone graft copolymer that may be used in the present invention is especially characterized in that it is formed of (a) an acrylic-modified silicone polymer (b) and a radical-polymerizable monomer or polymer thereof, both of which constitute the main backbone chain of the copolymer (B). Thus, the acrylic-modified silicone polymer and the radical-polymerizable monomer are not present in the polyacetal base resin as individual components, but instead are present in the form of a graft polymer. As will be described below, significant effects can be obtained in the present invention by virtue of this graft structure, whereas the effect cannot be attained by the addition of the components (a) or (b) alone.

Although the process for the preparation of the graft copolymer is not particularly limited, the acrylic-modified silicone component (a) can most easily be prepared by conventional condensation reaction processes. That is, when an acrylic compound represented by the general formula (2) where X is a chlorine atom is used, the condensation may be conducted through dehydrochlorination in the presence of an acid acceptor. When an acrylic compound represented by the general formula (2) where X is a methoxy or ethoxy group is used, the condensation may be conducted through elimination of an alcohol-molecule. During the condensation reaction process, the compound represented by the general formula (2) and the silicone represented by the general formula (1) may be used in such amounts as to give an equivalent ratio of the Si-X group to the SiOH group of between 0.25 and 1. When the amount of the compound of the general formula (2) is too large, the resulting silicone graft copolymer (b) has a tendency to gel easily. On the other hand, when the ratio is less than 0.25, an undesirably large amount of unreacted silicone will remain.

The acrylic-modified silicone component (a) prepared by the above process can be relatively easily copolymerized with a conventional radical-polymerizable monomer to give the silicone graft copolymer component (B). It is desirable that the amounts of the components (a) and (b) used to form the silicone graft copolymer component (B) be selected so as to give a silicone graft copolymer having a silicone content of between 5 to 80% by weight, and preferably between 10 to 70% by weight. Although the molecular weight of the graft copolymer thus prepared is not particularly limited, it is generally between 1,000 to 2,000,000, and preferably between 5,000 to 150,000.

According to the present invention, the amount of the component (B) to be used is between about 0.1 to 40 parts by weight, preferably between about 5 to 20 parts by weight per 100 parts by weight of the component (A). When the amount of the component (B) is too small, the surface gloss will not sufficiently be reduced. When the amount of component (A) is too large, however, the mechanical properties and/or heat stability will be adversely affected and thus economic disadvantages will ensue.

A molded article made from a composition comprising a polyacetal base resin (A) and a silicone graft copolymer (B) exhibits uniformly lower surface gloss having a profound and high-grade appearance which is also sufficiently improved in weathering (UV-light) resistance. The reasons why the surface gloss is lowered are thought to be that part of the silicone graft copolymer (B) dispersed in the molded article in the form of particles having a size of 0.5 to 2 μm migrates to the surface of the article so as to give the surface a roughened appearance. As a result, the surface gloss is lowered. Moreover, the silicone moiety is uniformly dispersed in the surface region of the polyacetal resin so that the lower surface gloss is uniform. A practically desirable surface gloss is 40% or below, still preferably 15% or below (as determined by JIS K 7105) even though the surface gloss varies depending upon the molding conditions and the degree of mold surface finishing that may be employed.

Although the composition of the present invention exhibits low gloss and excellent weathering resistance, the optional incorporation of a weather stabilizer is more effective in improving the weathering (UV-light) resistance properties of the polyacetal resin composition, particularly in terms of inhibiting crack formation on the surface of the molded article and resin discoloration.

The weathering (UV-light) stabilizer that may be used in the compositions of the present invention is one or more members selected from the group consisting of (1) benzotriazoles, (2) benzophenones, (3) oxanilides, (4) aromatic benzoates, (5) cyanoacrylates and (6) hindered amines.

Preferred benzotriazole include 2-(2'-hydroxy-5'-methylphenyl)benzotriazole, 2-(2'-hydroxy-3',5'-di-t-butylphenyl)benzotriazole, 2-(3,5-di-t-amyl-2-hydroxy-phenyl)benzotriazole, 2-(2'-hydroxy-3',5'-diisoamyl-phenyl)benzotriazole, 2-[2-hydroxy-3,5-bis($\alpha,\alpha$-dimethylbenzyl)phenyl]-benzotriazole and 2-(2'-hydroxy-4'-octoxyphenyl)-benzotriazole.

Examples of the benzophenones (2) include 2,4-dihydroxybenzophenone, 2-hydroxy-4-methoxy-benzophenone, 2-hydroxy-4-octoxybenzophenone, 2-hydroxy-4-dodecyloxy benzophenone, 2,2'-dihydroxy-4-methoxybenzophenone, 2,2'-dihydroxy-4,4'-dimethoxy-benzophenone, 2-hydroxy-4-methoxy-5-sulfobenzophenone and 2-hydroxy-4-oxybenzylbenzophenone.

Specific examples of the oxanilindes include N-(2-ethylphenyl)-N'-(2-ethoxy-5-t-butylphenyl) oxanilide and N-(2-ethylphenyl)-N'-(2-ethoxyphenyl) oxanilide.

Preferred examples of the aromatic benzoates include p-t-butylphenyl salicylate and p-octylphenyl salicylate.

Examples of the cyanoacrylates include 2-ethylhexyl 2-cyano-3, 3-diphenylacrylate and ethyl 2-cyano-3,3-diphenylacrylate.

The hindered amines are most preferably piperidine derivatives each having a sterically hindering group and examples thereof include 4-acetoxy-2,2,6,6-tetramethylpiperidine, 4-stearoyloxy-2,2,6,6-tetramethylpiperidine, 4-acryloyoxy-2,2,6,6,tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenlycarbamoyloxy)-2,2,6,6-tetramethylpiperidine, bis(2,2,6,6-tetramethyl-4-piperidyl) oxalate, bis(2,2,6,6-tetramethyl-4-piperidyl) malonate, bis(2,2,6,6-tetramethyl-4-piperidyl) adipate, bis(2,2,6,6-tetramethyl-4-piperidyl) sebacate, bis(1,2,2,6,6-peptamethyl-4-piperidyl) sebacate, bis(2,2,6,6-tetramethyl-4-piperidyl) terephthalate, 1,2-bis(2,2,6,6-tetramethyl-4-piperidyloxy) ethane, bis(2,2,6,6-tetramethyl-4-piperidyl) hexamethylene-1,6-dicarbamate, bis(1-methyl-2,2,6,6-tetramethyl-4-piperidyl) adipate and tris(2,2,6,6-tetramethyl-4-piperidyl) benzene-1,3,5-tricarboxylate. Further, high-molecular polycondensates of piperidine derivatives, such as dimethyl succinate-1-(2-hydroxyethyl)-4-hydroxy-2,2,6,6-tetramethylpiperdine polycondensate, are effectively used.

According to the present invention, one or more of the above weathering (UV-light) stabilizers noted previously may be used. Particularly, the simultaneous use of at least one hindered amine stabilizer with at least one other stabilizer is particularly effective. Most preferred is the simultaneous use of a benzotriazole with a hindered amine.

The weathering (UV-light) stabilizer may be used in an amount of between about 0.01 to 5 parts by weight, preferably between about 0.02 to 3 parts by weight, per 100 parts by weight of the polyacetal base resin. When the amount of the stabilizer is too small, little weather-resistance effects will be attained. The use of stabilizer in excessive amounts, however, will not only be economically disadvantageous but will also lower the mechanical properties of the resin and/or cause excessive mold deposits to be formed.

Compositions prepared by adding a weathering (UV-light) stabilizer to a polyacetal resin typically exhibit fairly excellent weathering resistance. However, the weathering resistance is typically not enough to withstand long-term exposure to outdoor conditions of sunlight (ultraviolet rays) and/or rain. The use of a weathering (UV-light) stabilizer, however, together with the silicone graft copolymer has been found to give a molded article exhibiting low surface gloss and significantly improved weathering resistance. Furthermore, the compositions of the present invention may further contain various known stabilizers in order to improve the composition's heat stability and the like. For this purpose, it is desirable to use one or more compounds selected from among known antioxidants, nitrogenous compounds and alkali and alkaline earth metal compounds. The compositions of the present invention may also be colored by the optional addition of various carbon blacks, dyes and/or pigments. Particularly, the use of carbon black is effective in further improving the weathering (UV-light) resistance of the polyacetal resin composition.

The compositions of the present invention may further contain one or more conventional additives in order to impart desirable characteristics depending upon the object specific end-use objectives. Examples of other additives that may be used include lubricants, nucleating agents, mold release agents, antistatic agents, surfactants, organic high-molecular weight polymers (other than the silicone graft copolymer component (B)) and inorganic or organic, fibrous, granular, powdery or flaky fillers.

The additional use of an additive known to lower the surface gloss of polyacetal resins generally (for example, talc, calcium carbonate or aluminum silicate) is somewhat effective.

The composition of the present invention can be prepared by conventional processes for preparing synthetic resin compositions using conventional processing equipment. For example, the necessary components may be mixed together, kneaded and extruded with a single- or twin-screw extruder to provide pellets, followed by molding of the pellets to form articles. Alternatively, the composition may be prepared by adding all components to a molding machine so that melt-blending occurs simultaneously with molding to form articles. Further, a part or the entirety of the resin components may be pulverized and mixed with the residual components, followed by melt-extrusion to provide pellets. The pellets may then be employed to form molded articles. The above stabilizers and additives may arbitrarily be added in any process step prior to the production of a final molded article. The resin compositions of the present invention may be molded by virtually any molding technique, for example, extrusion, injection, compression, vacuum blow or expansion molding techniques.

As described above, the compositions of the present invention comprising a polyacetal resin and a specific silicone graft copolymer may be formed into molded articles which exhibit significant lower surface gloss without impairing the well-balanced mechanical properties inherent with polyacetal resins generally. Furthermore, the compositions which optionally contain a weathering (UV-light) stabilizer are further improved in weathering resistance which has been problematic when conventional inorganic fillers (such as talc or calcium carbonate) are used. Particularly, the compositions exhibit crack initiation time which is significantly greater as compared to conventional compositions while, at the same time, having reduced discoloration.

Accordingly, the low-gloss polyacetal resin compositions of the present invention can advantageously be used in the production of various molded articles requiring high-grade appearances and high weathering (light) resistance (i.e., automotive internal trim parts such as inner handles, regulator handle and trim clips) and in other end-use applications in which the appearance of the molded article is required to be maintained in spite of long-term exposure to outdoor elements of sunlight and rain, for example, automotive exterior trim parts (such as outer handles and fuel lids), electrical appliances, building materials, cameras and housewares.

EXAMPLES

The present invention will be further described by the following non-limiting Examples.

In the following Examples, characteristic values such as surface appearance, weathering (UV-light) resistance and the like were determined by the following techniques.

(1) Surface appearance

The surface appearance was qualitatively ranked according to the following four criteria based on the dullness and uniformity of the surface, wherein a smaller numeral represents an article whose surface exhibits better dullness and uniformity.

1 ... no outlines of a fluorescent lamp recognized on the surface of a sample when the sample was irradiated; the surface was uniformly rough.
2 ... the surface of a sample was non-uniformly rough but no outlines of a fluorescent lamp were recognized on the surface when irradiated.
3 ... indistinct outlines of a fluorescent lamp were recognized on the surface of a sample when irradiated.
4 ... distinct outlines of a fluorescent lamp were recognized on the surface and the surface was nearly smooth.

(2) Surface gloss

The gloss of a test piece (70 mm×40 mm×3 mm) prepared by molding under the following conditions was determined according to Standard JIS K 7105 with a variable angle digital glossmeter (manufactured by Suga Test Instruments Co., Ltd.; UGV-40) at 45°-45° reflection.

| molding machine: manufactured by Toshiba Corporation, IS80 molding conditions: | | | | |
|---|---|---|---|---|
|  | nozzle | $C_1$ | $C_2$ | $C_3$ |
| cylinder temp. | 200 | 190 | 180 | 160 (°C.) |
| injection pressure | 650 (kg/cm$^2$) | | | |
| injection speed | 1.0 (m/min) | | | |
| mold temp. | 80 (°C.) | | | |

(3) Weathering test

A test piece was irradiated with ultraviolet rays in a weathermeter (Suga Test Instruments Co., Ltd., WBL-SUN-HCH type) under the conditions of a black panel temperature of 63° C. and weathering (including simulated rain spray) to determine the crack initiation time and the change in surface appearance.

(i) crack initiation time

A test piece was irradiated with ultraviolet rays under the above conditions. The surface of the test piece was observed with a 10x magnifier to determine the time elapsed until the first cracks were recognized. The time was regarded as the "crack initiation time". A higher crack initiation time thus denoted a better weathering resistance.

(ii) change in the surface appearance

A test piece was irradiated with ultraviolet rays under the above conditions for a predetermined time (600, 1000 or 2000 hours) to observe changes in the hue of the test piece before and after irradiation and crack formation. The observed changes were indicated by five qualitative rankings. A smaller numerical ranking means less changes, i.e., less discoloration and/or less cracking.

(4) Tensile test

The tensile strength and tensile elongation were determined according to ASTM D 638.

As shown in Table 1, a polyacetal resin component (A) (a product of Polyplastics; trade name "Duracon" (M90) was mixed with a silicone graft copolymer (B) either alone or together with a weather (light) stabilizer component (C) and, if necessary, carbon black. The obtained mixture was melt-kneaded with a 30-mm twin-screw extruder to give a pelletized composition. The composition was then molded into a test piece with an injection molding machine. The test piece was examined for gloss, weathering resistance and other characteristics. For comparison, the same procedure as that described above was repeated except that ungrafted silicone oil, an acrylic resin, a weathering (light) stabilizer and/or a conventional additive having a known surface gloss-lowering effect were used instead of the component (B) as specified in Table 2. The results are given in Tables 1 and 2.

TABLE 1

|  | Example No. | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| (A) polyacetal resin (pts. by wt.) | 100 | 100 | 100 | 100 | 100 | 100 | 100 | 100 | 100 | 100 | 100 | 100 |
| (B) silicone graft polymer | | | | | | | | | | | | |
| note 1 | B-1 | B-1 | B-1 | B-2 | B-2 | B-1 | B-1 | B-1 | B-1 | B-1 | B-1 | B-1 |
| (pts. by wt.) | 5 | 10 | 20 | 5 | 10 | 10 | 10 | 10 | 20 | 30 | 10 | 10 |
| (C) weathering (light) stabilizer (pts. by wt.) | | | | | | | | | | | | |
| note 2 |  |  |  |  |  | C-1 |  | C-1 | C-1 | C-1 | C-1 | C-2 |
|  |  |  |  |  |  | 0.6 |  | 0.3 | 0.3 | 0.3 | 0.3 | 0.3 |
| note 3 |  |  |  |  |  |  | C-3 | C-3 | C-3 | C-3 | C-4 | C-3 |
|  |  |  |  |  |  |  | 0.6 | 0.3 | 0.3 | 0.3 | 0.3 | 0.3 |

TABLE 1-continued

|  |  |  |  |  |  |  |  |  |  |  |  |
|---|---|---|---|---|---|---|---|---|---|---|---|
| silicone oil (pts. by wt.) |  |  |  |  |  |  |  |  |  |  |  |
| PMMA (pts. by wt.) |  |  |  |  |  |  |  |  |  |  |  |
| talc (pts. by wt.) |  |  |  |  |  |  |  |  |  |  |  |
| carbon black (pts. by wt.) |  |  |  |  |  |  |  |  |  |  |  |
| surface appearance | 2 | 1 | 1 | 2 | 1 | 1 | 1 | 1 | 1 | 2 | 1 | 1 |
| gloss (45°-45°) (%) | 25 | 10 | 5 | 30 | 14 | 9 | 8 | 10 | 6 | 5 | 9 | 10 |
| weathering test |  |  |  |  |  |  |  |  |  |  |  |  |
| crack initiation time (hr) | 360 | 480 | 600 | 360 | 420 | 720 | 660 | 1020 | 1320 | 1440 | 780 | 720 |
| change in surface appearance |  |  |  |  |  |  |  |  |  |  |  |  |
| after 600 hr | 2 | 2 | 1 | 2 | 2 | 1 | 1 | 1 | 1 | 1 | 1 | 1 |
| after 1000 hr | 4 | 4 | 3 | 4 | 4 | 2 | 3 | 1 | 1 | 1 | 2 | 2 |
| after 2000 hr | 5 | 5 | 4 | 5 | 5 | 4 | 5 | 3 | 3 | 2 | 4 | 4 |
| tensile test |  |  |  |  |  |  |  |  |  |  |  |  |
| elongation (%) | 45 | 37 | 22 | 42 | 35 | 41 | 41 | 40 | 21 | 16 | 41 | 38 |
| yield strength (kg/cm$^2$) | 577 | 601 | 618 | 590 | 608 | 591 | 594 | 595 | 620 | 630 | 570 | 581 |

|  | Example No. |  |  |  |  |  |  |
|---|---|---|---|---|---|---|---|
|  | 13 | 14 | 15 | 16 | 17 | 18 | 19 |
| (A) polyacetal resin (pts. by wt.) | 100 | 100 | 100 | 100 | 100 | 100 | 100 |
| (B) silicone graft polymer |  |  |  |  |  |  |  |
| note 1 | B-2 | B-2 | B-2 | B-1 | B-1 | B-1 | B-2 |
| (pts. by wt.) | 10 | 20 | 10 | 5 | 10 | 20 | 10 |
| (C) weathering (light) stabilizer (pts. by wt.) |  |  |  |  |  |  |  |
| note 2 | C-1 | C-1 | C-1 | C-1 | C-1 | C-1 | C-1 |
|  | 0.3 | 0.3 | 0.3 | 0.3 | 0.3 | 0.3 | 0.3 |
| note 3 | C-3 | C-3 | C-4 | C-3 | C-3 | C-3 | C-3 |
|  | 0.3 | 0.3 | 0.3 | 0.3 | 0.3 | 0.3 | 0.3 |
| silicone oil (pts. by wt.) |  |  |  |  |  |  |  |
| PMMA (pts. by wt.) |  |  |  |  |  |  |  |
| talc (pts. by wt.) |  |  |  |  |  |  |  |
| carbon black (pts. by wt.) |  |  |  | 0.5 | 0.5 | 0.5 | 0.5 |
| surface appearance | 1 | 1 | 1 | 2 | 1 | 1 | 1 |
| gloss (45°-45°) (%) | 13 | 8 | 13 | 27 | 13 | 7 | 15 |
| weathering test |  |  |  |  |  |  |  |
| crack initiation time (hr) | 960 | 1200 | 720 | 1620 | 1800 | 2000 or above | 1740 |
| change in surface appearance |  |  |  |  |  |  |  |
| after 600 hr | 1 | 1 | 1 | 1 | 1 | 1 | 1 |
| after 1000 hr | 2 | 1 | 3 | 1 | 1 | 1 | 1 |
| after 2000 hr | 4 | 4 | 5 | 2 | 1 | 1 | 1 |
| tensile test |  |  |  |  |  |  |  |
| elongation (%) | 37 | 24 | 37 | 44 | 40 | 22 | 37 |
| yield strength (kg/cm$^2$) | 605 | 616 | 602 | 577 | 590 | 620 | 608 |

TABLE 2

|  | Comparative Example No. |  |  |  |  |  |  |  |  |  |  |  |  |  |  |  |  |
|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 |
| (A) polyacetal resin (pts. by wt.) | 100 | 100 | 100 | 100 | 100 | 100 | 100 | 100 | 100 | 100 | 100 | 100 | 100 | 100 | 100 | 100 | 100 |
| (B) silicone graft polymer |  |  |  |  |  |  |  |  |  |  |  |  |  |  |  |  |  |
| note 1 |  |  |  |  |  |  |  |  |  |  |  |  |  |  |  |  |  |
| (pts. by wt.) |  |  |  |  |  |  |  |  |  |  |  |  |  |  |  |  |  |
| (C) weathering (light) stabilizer (pts. by wt.) |  |  |  |  |  |  |  |  |  |  |  |  |  |  |  |  |  |
| note 2 |  |  |  |  |  |  |  | C-1 |  | C-1 | C-1 | C-2 | C-1 | C-1 | C-1 | C-1 | C-1 |
|  |  |  |  |  |  |  |  | 0.6 |  | 0.3 | 0.3 | 0.3 | 0.3 | 0.3 | 0.3 | 0.3 | 0.3 |
| note 3 |  |  |  |  |  |  |  |  | C-3 | C-3 | C-4 | C-3 | C-3 | C-3 | C-3 | C-3 | C-3 |
|  |  |  |  |  |  |  |  |  | 0.6 | 0.3 | 0.3 | 0.3 | 0.3 | 0.3 | 0.3 | 0.3 | 0.3 |
| silicone oil (pts. by wt.) |  | 2 |  | 2 |  |  |  |  |  |  |  |  | 2 | 2 |  |  | 2 |
| PMMA (pts. by wt.) |  |  | 10 | 10 |  |  |  |  |  |  |  |  |  | 10 |  | 10 | 10 |
| talc (pts. by wt.) |  |  |  |  | 10 | 20 |  |  |  |  |  |  |  |  | 10 |  | 10 |
| carbon black (pts. by wt.) |  |  |  |  |  |  |  |  |  |  |  |  |  |  |  | 0.5 | 0.5 |
| surface appearance | 4 | 4 | 4 | 4 | 2 | 2 | 4 | 4 | 4 | 4 | 4 | 4 | 4 | 2 | 4 | 4 | 2 |
| gloss (45°-45°) (%) | 82 | 68 | 80 | 70 | 17 | 6 | 78 | 74 | 75 | 74 | 72 | 65 | 70 | 18 | 77 | 67 | 21 |
| weathering test |  |  |  |  |  |  |  |  |  |  |  |  |  |  |  |  |  |
| crack initiation time (hr) | 180 | 180 | 300 | 240 | 180 | 120 | 360 | 300 | 420 | 360 | 300 | 240 | 360 | 300 | 660 | 540 | 420 |
| change in surface appearance |  |  |  |  |  |  |  |  |  |  |  |  |  |  |  |  |  |

TABLE 2-continued

|  | Comparative Example No. | | | | | | | | | | | | | | | | |
|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 |
| after 600 hr | 5 | 5 | 4 | 5 | 4 | 5 | 3 | 4 | 2 | 3 | 3 | 5 | 4 | 4 | 2 | 3 | 3 |
| after 1000 hr | 5 | 5 | 5 | 5 | 5 | 5 | 5 | 5 | 5 | 5 | 5 | 5 | 5 | 5 | 4 | 5 | 5 |
| after 2000 hr | 5 | 5 | 5 | 5 | 5 | 5 | 5 | 5 | 5 | 5 | 5 | 5 | 5 | 5 | 5 | 5 | 5 |
| tensile test |  |  |  |  |  |  |  |  |  |  |  |  |  |  |  |  |  |
| elongation (%) | 77 | 77 | 23 | 35 | 9 | 6 | 71 | 70 | 70 | 75 | 73 | 77 | 33 | 8 | 25 | 31 | 8 |
| yield strength (kg/cm$^2$) | 610 | 550 | 593 | 527 | 540 | 520 | 595 | 607 | 600 | 590 | 582 | 540 | 520 | 525 | 590 | 523 | 525 |

Note 1:
B-1: copolymer comprising methyl methacrylate and an acrylic-modified silicone prepared from α,ω-dihydroxypolydimethylsiloxane and γ-methacryloxypropyldimethylchlorosilane.
B-2: copolymer comprising methyl methacrylate and an acrylic-modified silicone prepared from α,ω-dihydroxypolydimethylsiloxane and γ-methacryloxypropyltrichlorosilane.
Note 2:
C-1: 2-[2-hydroxy-3,5-bis(α,α-dimethylbenzyl)-phenyl]benzotriazole.
C-2: 2-hydroxy-4-oxybenzylbenzophenone.
C-3: bis(2,2,6,6-tetramethyl-4-piperidyl)sebacate.
C-4: dimethyl succinate-1-(2-hydroxyethyl)-4-hydroxy-2,2,6,6-tetramethylpiperidine polycondensate.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A low surface gloss polyacetal resin composition comprising
   (A) 100 parts by weight of a polyacetal resin; and
   (B) a surface gloss reducing effective amount between about 0.1 to 40 parts by weight of a silicone graft copolymer which is the radical copolymerization product of, and has units constituting its main backbone chain derived from, comonomers (a) and (b), wherein comonomer (a) is an acrylic-modified silicone which is the condensation reaction product of α,ω-dihydroxypolydimethylsiloxane with γ-methacryloxypropyldimethylchlorosilane or γ-methacryloxypropyltrichlorosilane, and wherein comonomer (b) is acrylic or methacrylic acid or an ester thereof.

2. A polyacetal resin composition as in claim 1 which further contains (C) between about 0.01 to 5 parts by weight, per 100 parts by weight of the polyacetal of a weather stabilizer.

3. A polyacetal resin composition as set forth in claim 5, wherein said weather stabilizer is at least one compound selected from the group consisting of benzotriazoles, benzophenones, oxanilides, aromatic benzoates, cyanoacrylates and hindered amines.

4. A polyacetal resin composition as set forth in claim 3, wherein said weather stabilizer comprises a combination of a hindered amine and at least one other compound selected from benzotriazoles, benzophenones, oxanilides, aromatic benzoates and cyanoacrylates.

5. A molded article having a low surface gloss which consists essentially of the polyacetal resin composition of claim 1.

* * * * *

UNITED STATES PATENT AND TRADEMARK OFFICE
CERTIFICATE OF CORRECTION

PATENT NO. : 5,190,828
DATED     : March 2, 1993
INVENTOR(S) : Tohru KATSUMATA It is certified that error appears in the above-identified patent and that said Letters Patent is hereby corrected as shown below:

Column 5, line 13, after "Preferred" change "benzotriazole" to --benzotriazoles--.

Signed and Sealed this

Thirtieth Day of November, 1993

Attest:

BRUCE LEHMAN

*Attesting Officer*    Commissioner of Patents and Trademarks